UNITED STATES PATENT OFFICE.

CARLETON ELLIS, OF LARCHMONT, NEW YORK, ASSIGNOR, BY MESNE ASSIGNMENTS, TO F. H. BENNETT BISCUIT COMPANY, A CORPORATION OF NEW YORK.

FEEDING-STUFF.

1,019,734. Specification of Letters Patent. Patented Mar. 5, 1912.

No Drawing. Application filed December 26, 1908. Serial No. 469,299.

*To all whom it may concern:*

Be it known that I, CARLETON ELLIS, citizen of the United States, residing at Larchmont, in the county of Westchester and State of New York, have invented certain new and useful Improvements in Feeding-Stuff, of which the following is a specification.

This invention relates to a horse food or biscuit and relates particularly to a saccharinated material containing preferably milk in a malted form.

The object of this invention is to provide a concentrated conditioning food for horses which has especial nutritive properties.

In preparing my improved composition, I preferably make use of sugar beet in a dried and comminuted form in combination with edible grain material such for instance as oats, oatmeal, corn, corn meal, barley, rye, wheat and their various meals and flours, oil meal, such as linseed, rape or cotton seed meals and flours, peanut press cakes, flesh meal, fish meal, blood meal, dried gluten, dried distillery slop, middlings, dried potato and grain washes and the like, ground peas and beans and similar edible material. As a milk basis, I prefer to use dried milk such as ordinary evaporated milk, but may also use ordinary fluid milk, especially the waste milk of slaughter houses, etc. Such milk material is preferably malted and I may accomplish this change through the agency of malt extracts preferably those containing a large amount of diastatic ferments. Brewers' grain may also be added, as also the acrospires from the malting operation. As a binding material, I preferably employ ordinary wheat flour although other flour materials may be employed. Glutenous flour is particularly useful in this respect.

While I prefer to employ sugar beet owing to the desirable flavoring and assimilative properties which it lends to the composition, I may use in whole or in part as a saccharine material under certain circumstances, glucose or molasses or other sugars.

In order to secure the maximum of diastatic change, I preferably work up the various materials with water to form a somewhat plastic mass, heating to a temperature ordinarily of 50 to 60° C. as this is the most effective temperature for conversion of the starchy material and the like into the resultant bodies due to the action of diastase.

A composition illustrative of my invention consists of corn meal 30 lbs., dried milk 5 lbs., sifted bran 30 lbs., oil meal 10 lbs., gluten flour 15 lbs., salt 2 lbs., dried ground sugar beet 30 lbs., malt extract 4 lbs. This is worked into a dough with a mixture of equal parts of waste milk and water and is warmed to a temperature of about 60° and allowed to stand until conversion has progressed to a satisfactory degree. The mixture is then rolled into the form of cakes and these are baked.

The oil meal referred to in the above illustrative formula preferably is cotton seed meal but other seed meals rich in oil, such as linseed, may be used.

Horses or cattle fed on this material thrive exceedingly well. It has been observed to brighten and enhance the character of the coat of horses. In the fall and winter it is an especially useful feed because its peculiar tonic action prevents to a large extent diseases and ailments peculiar to these seasons. From 2 to 4 lbs. of this material is ordinarily to be used per day in partial substitution for the usual feed.

What I claim is:—

1. A feeding stuff which comprises partially malted sugar beet and partially malted edible grain material.

2. A feeding stuff which comprises partially malted sugar beet, partially malted grain material and partially malted milk.

In testimony whereof I have affixed my signature in presence of two witnesses.

CARLETON ELLIS.

Witnesses:
NATHANIEL L. FOSTER,
FRANCES I. NEWMAN.